US011216010B2

(12) United States Patent
Kama et al.

(10) Patent No.: US 11,216,010 B2
(45) Date of Patent: Jan. 4, 2022

(54) LEADER MOVABLE BODY, FOLLOWER MOVABLE BODY, AND GROUP TRAVEL CONTROL SYSTEM

(71) Applicant: TOYOTA JIDOSHA KABUSHIKI KAISHA, Toyota (JP)

(72) Inventors: Takeshi Kama, Nagakute (JP); Yusuke Hara, Nagoya (JP); Hiroshi Hiraiwa, Toyota (JP); Takahiro Shiga, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 16/601,624

(22) Filed: Oct. 15, 2019

(65) Prior Publication Data
US 2020/0142429 A1    May 7, 2020

(30) Foreign Application Priority Data

Nov. 1, 2018 (JP) .............................. JP2018-206498

(51) Int. Cl.
| | |
|---|---|
| *G05D 1/00* | (2006.01) |
| *G05D 1/02* | (2020.01) |
| *B60W 30/165* | (2020.01) |
| *G08G 1/00* | (2006.01) |

(52) U.S. Cl.
CPC ......... *G05D 1/0295* (2013.01); *B60W 30/165* (2013.01); *G08G 1/22* (2013.01); *G05D 2201/02* (2013.01)

(58) Field of Classification Search
CPC ............. G05D 1/0295; G05D 2201/02; G05D 2201/0212; G05D 1/0291; B60W 30/165; G08G 1/22; B62K 5/007; B62K 11/007; B62K 11/00; H04W 4/46
See application file for complete search history.

(56) References Cited

U.S. PATENT DOCUMENTS

| | | | | |
|---|---|---|---|---|
| 8,352,111 B2* | 1/2013 | Mudalige | ............... | G08G 1/163 701/24 |
| 2008/0059007 A1* | 3/2008 | Whittaker | ................ | G08G 1/22 701/2 |
| 2011/0184596 A1* | 7/2011 | Andreasson | ............ | B61L 23/34 701/19 |
| 2013/0030606 A1* | 1/2013 | Mudalige | ............. | G05D 1/0293 701/2 |
| 2013/0079953 A1* | 3/2013 | Kumabe | ................... | G08G 1/22 701/2 |
| 2013/0211624 A1* | 8/2013 | Lind | ........................ | G08G 1/22 701/2 |

(Continued)

FOREIGN PATENT DOCUMENTS

| | | | | |
|---|---|---|---|---|
| DE | 102012212681 A1 * | 1/2013 | ............... | G08G 1/22 |
| JP | 2016-078719 A | 5/2016 | | |
| WO | 2007/143756 A2 | 12/2007 | | |

*Primary Examiner* — Peter D Nolan
*Assistant Examiner* — Peter Y Ning
(74) *Attorney, Agent, or Firm* — Oliff PLC

(57) ABSTRACT

A leader movable body includes a degree of freedom setting unit configured to set a degree of freedom relevant to movement of a follower movable body, and a transmitter configured to transmit the set degree of freedom to the follower movable body. The follower movable body is configured to perform group travel with respect to the leader movable body.

15 Claims, 10 Drawing Sheets

(56) References Cited

U.S. PATENT DOCUMENTS

| | | | |
|---|---|---|---|
| 2014/0107867 A1* | 4/2014 | Yamashiro | G08G 1/167 |
| | | | 701/2 |
| 2016/0059881 A1* | 3/2016 | Hornberger | B62D 1/283 |
| | | | 701/24 |
| 2016/0171894 A1* | 6/2016 | Harvey | G05D 1/0293 |
| | | | 701/23 |
| 2016/0267795 A1* | 9/2016 | Miyazawa | B60W 30/12 |
| 2017/0038777 A1* | 2/2017 | Harvey | G05D 1/0027 |
| 2018/0047293 A1* | 2/2018 | Dudar | B60W 30/165 |
| 2018/0120861 A1* | 5/2018 | Saxena | G05D 1/0291 |

* cited by examiner

FIG. 6
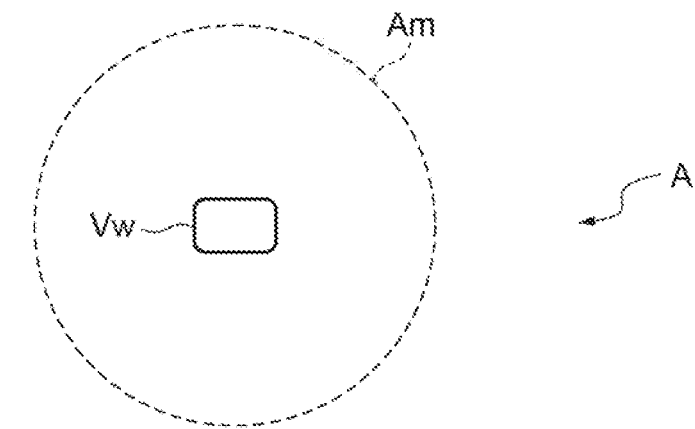
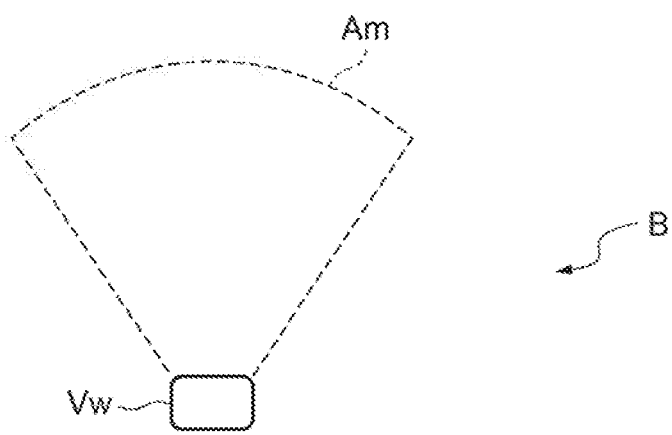
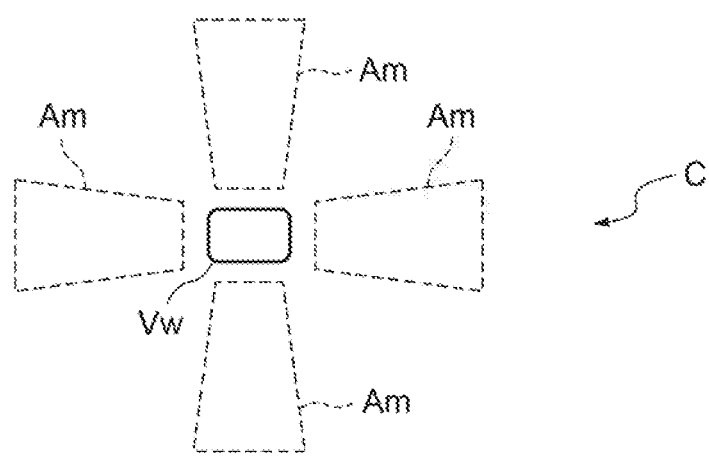

LEADER MOVABLE BODY, FOLLOWER MOVABLE BODY, AND GROUP TRAVEL CONTROL SYSTEM

INCORPORATION BY REFERENCE

The disclosure of Japanese Patent Application No. 2018-206498 filed on Nov. 1, 2018 including the specification, drawings and abstract is incorporated herein by reference in its entirety.

BACKGROUND

1. Technical Field

The present disclosure relates to a leader movable body, a follower movable body, and a group travel control system.

2. Description of Related Art

Various types of vehicles (what is called ultra-compact movable bodies) have been proposed which are smaller than automobiles and easy to maneuver, the vehicles providing user-friendly mobility for up to two people. For example, Japanese Patent Application Publication No. 2016-78719 discloses, as an example of the ultra-compact movable body, an inverted mobile object that accommodates a user in a standing position and allows the user to operate the mobile object. The user can control a travel direction of the inverted mobile object by performing operations such as operating a handle, moving a centroid position, and changing the inclination of a step.

SUMMARY

Since such an ultra-compact movable body provides new mobility to a wide generation, the introduction of the ultra-compact movable body is positively promoted in such places as tourist resorts. Some of the tourist resorts are providing a trial rental service of the ultra-compact movable bodies to family tourists and group tourists, as means for mobility in sight-seeing tours or archaeological tours. However, in the case where, for example, a parent and a child ride on different ultra-compact movable bodies, the child is given freedom of movement. As a result, the parent needs to pay attention to prevent undesirable situations, such as the child getting lost or going to dangerous places without asking the parent, and this makes it difficult for the parent to sufficiently enjoy sightseeing.

The present disclosure provides a technique of setting a leader-follower relationship between movable bodies, and allowing a leader movable body to set the degree of freedom relevant to movement of a follower movable body.

A first aspect of the present disclosure is a leader movable body. The leader movable body includes a degree of freedom setting unit and a transmitter. The degree of freedom setting unit is configured to set a degree of freedom relevant to movement of a follower movable body. The transmitter is configured to transmit the degree of freedom to the follower movable body. The follower movable body is configured to perform group travel with respect to the leader movable body.

In the first aspect, the degree of freedom may include an allowable value of at least one parameter, out of a movement distance, a movement speed, a movement acceleration, and a movement range of the follower movable body.

In the first aspect, the leader movable body may include an input unit configured to allow a user to input an instruction for setting the degree of freedom relevant to movement of the follower movable body. The degree of freedom setting unit may be configured to set the degree of freedom in accordance with the instruction for setting the degree of freedom to be input.

In the first aspect, the leader movable body may include a sensor unit configured to detect a surrounding environment of the leader movable body. The degree of freedom setting unit may be configured to set the degree of freedom based on a detection result of the sensor unit.

In the first aspect, the leader movable body may include a generation unit configured to generate a forcing command for forcibly controlling movement of the follower movable body, irrespective of the degree of freedom set for the follower movable body.

In the first aspect, the degree of freedom may be used on controlling movement of the follower movable body.

In the first aspect, the follower movable body may be configured to be controlled such that movement of the follower movable body is controlled in accordance with the degree of freedom.

A second aspect of the present disclosure is a follower movable body. The follower movable body includes a receiver and a movement control unit. The receiver is configured to receive a degree of freedom relevant to movement from a leader movable body. The movement control unit is configured to control movement of the follower movable body in accordance with the degree of freedom. The follower movable body is configured to perform group travel with respect to the leader movable body.

In the second aspect, the follower movable body may include a notification unit configured to notify the degree of freedom.

A third aspect of the present disclosure is a group travel control system. The group travel control system includes a leader movable body, and a follower movable body. The follower movable body is configured to perform group travel with respect to the leader movable body. The leader movable body includes a degree of freedom setting unit configured to set a degree of freedom relevant to movement of the follower movable body, and a transmitter configured to transmit the degree of freedom to the follower movable body. The follower movable body includes a receiver configured to receive the degree of freedom from the leader movable body, and a movement control unit configured to control movement of the follower movable body in accordance with the degree of freedom.

In the third aspect, the group travel control system may be configured such that a leader-follower relationship is set between the leader movable body and the follower movable body.

According to the first aspect, the second aspect, and the third aspect of the present disclosure, it becomes possible to set the leader-follower relationship between movable bodies, and to allow the leader movable body to set the degree of freedom relevant to movement of the follower movable body.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 illustrates a movement range of the worker vehicle;

DETAILED DESCRIPTION OF EMBODIMENTS

Figure 1:
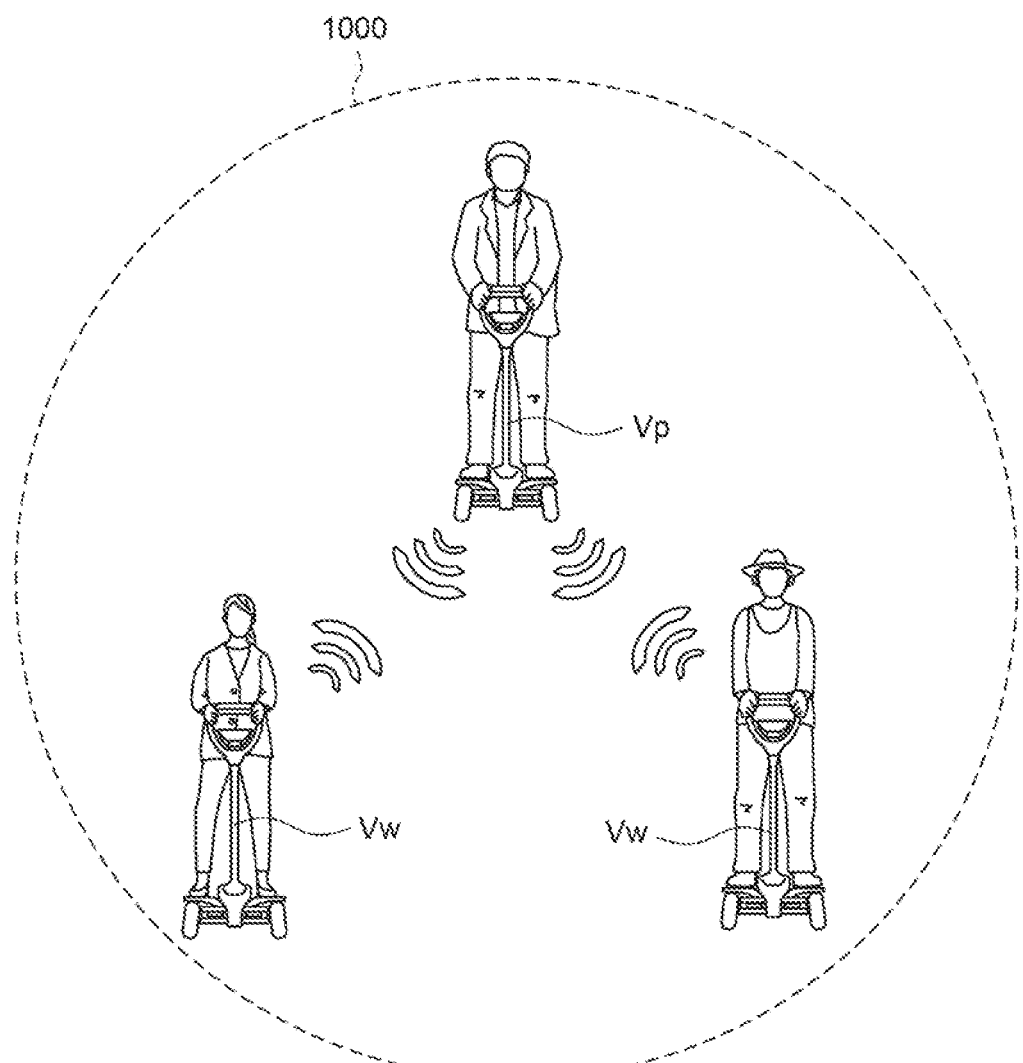
FIG. 1 is a concept view of a group travel control system according to the present embodiment.

Hereinafter, preferable embodiments of the present disclosure will be described with reference to the accompanying drawings. In the drawings, identical or like component members are designated by identical numerals.

A. First Embodiment

A-1. Summary

FIG. 1 is a concept view of a group travel control system 1000 according to the present embodiment. FIG. 1 shows the case where one vehicle serves as a leader vehicle Vp (hereinafter, parent vehicle), and other vehicles travel as follower vehicles Vw (hereinafter, worker vehicles). The number of the parent vehicles Vp and the worker vehicles Vw, may be any number, such as one or more. The present embodiment assumes the vehicles as so-called ultra-compact movable bodies (e.g., ultra-compact electric vehicles, that is, inverted mobile objects in FIG. 1) for one person. However, it is not intended to limit the vehicles to the ultra-compact movable bodies. Examples of the case assumed by the system 1000 include the case where a parent or parents operate the parent vehicles Vp, and a child or children operate the worker vehicles Vw, and the case where, for example, a tour guide operates the parent vehicle Vp and tour participants operate the worker vehicles. However, the system 1000 may be used in any cases.

In the group travel control system 1000, a leader-follower relationship can be set between the parent vehicle Vp and the worker vehicle Vw. The parent vehicle Vp can set the degree of freedom relevant to movement of the worker vehicle Vw (that is, the movement can be limited) (the details will be described later). Instead of completely following the parent vehicle Vp, the worker vehicle Vw can freely move within the range of the set degree of freedom relevant to the movement (hereinafter, simply referred to as "degree of freedom"), while following the parent vehicle Vp. In the following description, "group travel" refers to a travel of the parent vehicle Vp and the worker vehicles Vw, with a leader-follower relationship being set therebetween and the degree of freedom being set for the worker vehicle Vw.

A-2. Appearance Configuration of Vehicle

Figure 2:
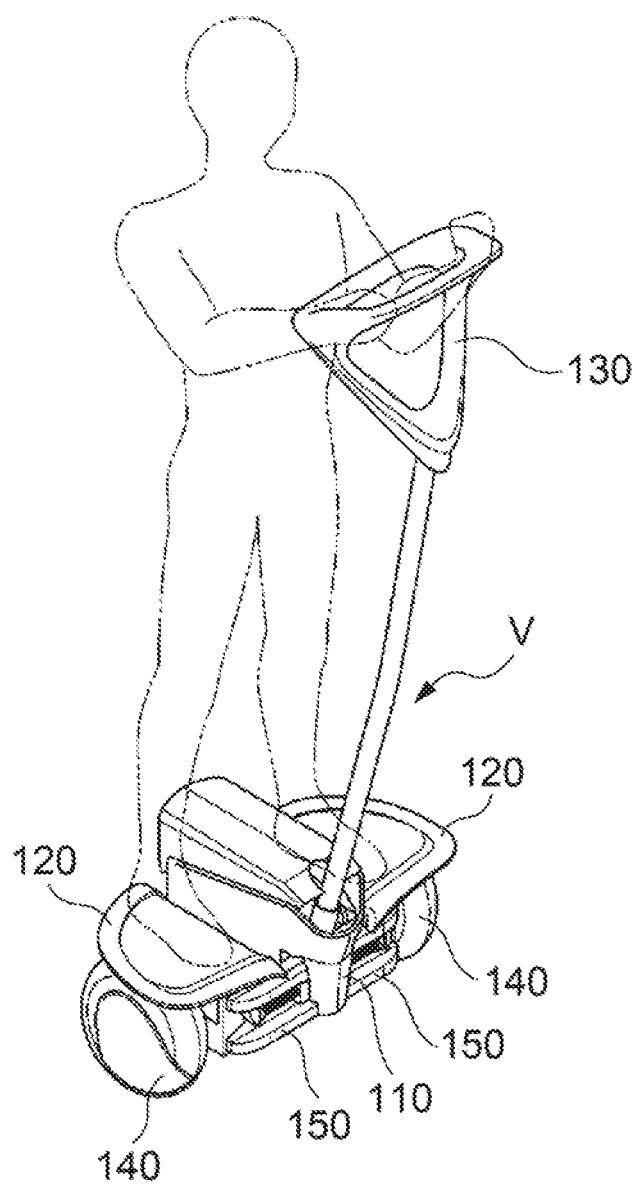
FIG. 2 is an appearance view of a parent vehicle and a worker vehicle.

FIG. 2 is an appearance view of the parent vehicle Vp and the worker vehicle Vw. When it is not particularly necessary to distinguish between the parent vehicle Vp and the worker vehicle Vw, the vehicles Vp and Vw are each called a vehicle V. The vehicle V is a coaxial two wheeler that can move while maintaining an inverted state by individually controlling a pair of wheels 140. The vehicle V includes a vehicle body 110, a pair of right and left step units 120 on which a user rides on, the step units 120 being attached to the vehicle body 110. The vehicle V also includes an operating handle 130 for the user to grip, the operating handle 130 being tiltable and attached to the vehicle body 110, a pair of right and left wheels 140 rotatably attached to the vehicle body 110, and a driving unit 150 that drives the wheels 140.

The vehicle V can move backward and forward by the user shifting the center of gravity back and forth so as to incline the step units 120 of the vehicle body 110 back and forth. The vehicle V can turn right and left by the user shifting the center of gravity right and left so as to incline the step units 120 of the vehicle body 110 right and left.

A-3. System Configuration of Parent Vehicle

Figure 3:
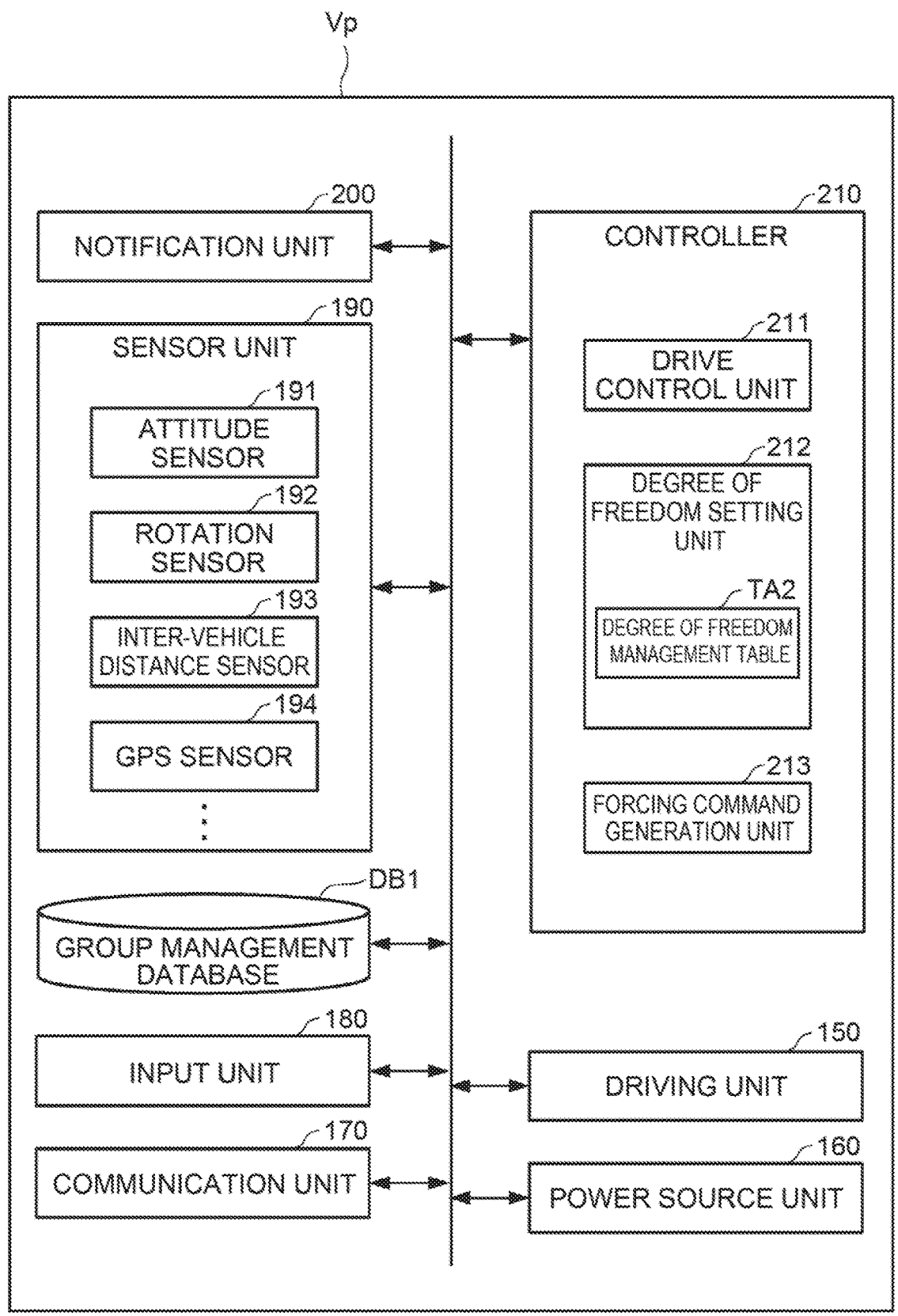
FIG. 3 is a block diagram showing the system configuration of the parent vehicle.

FIG. 3 is a block diagram showing the system configuration of the parent vehicle (leader movable body) Vp. The vehicle body 110 incorporates the driving unit 150 that includes an electric motor and various gears. Under the control of a controller 210, the driving unit 150 performs inversion control so as to prevent a fall, while enabling the vehicle V to travel.

The vehicle body 110 incorporates a power source unit 160 that is configured of a lithium ion battery or the like. The power source unit 160 supplies electric power to devices that constitute the vehicle V, and other electronic devices.

A communication unit 170 is provided to establish a wireless car-to-car communication with the worker vehicles Vw. The communication unit 170 is configured to include a transmitter, a receiver, and a communication interface in conformity with telecommunications standards for wireless LAN, cellular phones, or the like. It is not intended to limit the wireless communication between the parent vehicle Vp and the worker vehicles Vw to a direct car-to-car communication. Rather, the wireless communication may be an indirect car-to-car communication with another vehicle that functions as a relay station, a road-to-vehicle communication with a fixed station that functions as a relay station, and also a terrestrial-satellite communication with a satellite station that functions as a relay station. In the following description, for convenience, the user who rides in the parent vehicle Vp is called "parent user", and the user who rides in the worker vehicle Vw is called "worker user". The user who rides in a vehicle that is not particularly limited is simply called "user."

The input unit 180 is provided in the vicinity of the operating handle 130. The input unit 180 is configured of an operation button, an operation switch, a touch panel, a sound collector for allowing voice input, and the like. Properly operating the input unit 180 enables a parent user to input an instruction for setting the degree of freedom of the worker vehicle Vw, and an instruction for generating a forcing command (described later) for the worker vehicle Vw. Before using the system 1000, the parent user properly operates the input unit 180 to set a leader-follower relationship where the vehicle V to be operated by the parent user is defined as a parent vehicle Vp and the vehicles V to be operated by worker users as worker vehicles Vw. When such setting is performed, information required for setting the leader-follower relationship is exchanged between the parent vehicle Vp and the worker vehicles Vw. The information indicating the content of the leader-follower relationship, or the like, is stored in a group management database DB1 in each of the vehicles V.

Figure 4:
FIG. 4 illustrates a registration content of a group management database.

FIG. 4 illustrates a registration content of the group management database DB1. As shown in FIG. 4, registered in the group management database DB1 is a group management table TA1 that associates a group ID for identifying a group having the leader-follower relationship established, a parent ID for identifying a parent vehicle Vp, worker IDs for identifying worker vehicles Vw, and set degree of freedom of the worker vehicles Vw. When an own vehicle is set as a parent vehicle Vp, the ID that identifies the own vehicle is registered as a parent ID. When the own vehicle is set as a worker vehicle Vw, the ID that identifies the own vehicle is registered as a worker ID.

The vehicle body 110 incorporates a sensor unit 190 that is configured of various measuring instruments including an attitude sensor 191, a rotation sensor 192, an inter-vehicle distance sensor 193, and a GPS sensor 194. The attitude sensor 191 is provided in the vehicle body 110 to detect and output attitude information regarding the vehicle body 110, the operating handle 130, or the like. The attitude sensor 191 is configured to detect attitude information when the vehicle V travels. For example, the attitude sensor 191 is configured of a gyro sensor, an acceleration sensor, or the like. When a user inclines the operating handle 130 forward or backward, the step units 120 incline in the same direction. The attitude sensor 191 detects attitude information (what is called a three-dimensional attitude angle, or the like) corresponding to the inclination. The attitude sensor 191 outputs the detected attitude information to the controller 210.

The rotation sensor 192 is provided in each of the wheels 140. The rotation sensor 192 detects rotation information such as a rotation angle, a rotation angular speed, and a rotation angle acceleration of each of the wheels 140. Each of the rotation sensors 192 is configured of, for example, a rotary encoder, a resolver, or the like. Each of the rotation sensors 192 outputs the detected rotation information to the controller 210.

The inter-vehicle distance sensor 193 is provided in the vehicle body 110 to detect inter-vehicle distance information indicating an inter-vehicle distance between the own vehicle and other vehicles. The inter-vehicle distance sensor 193 detects inter-vehicle distance information by using a radar device, such as a laser radar and a millimeter-wave radar, and outputs the detected inter-vehicle distance information to the controller 210.

For example, the GPS sensor 194 is a component member of a location information measurement system using satellites. The GPS sensor 194 measures the location (longitude, latitude, altitude, or the like) of the own vehicle by receiving radio waves from a large number of GPS Satellites, and outputs the measured location as location information to the controller 210.

A notification unit 200 is configured of a speaker that outputs sound, a light that turns on and blinks an alarm lamp, and a display that displays a warning, or the like. The notification unit 200 notifies the user about various information based on a notification signal from the controller 210. For example, the notification unit 200 may be used to notify the set degree of freedom. For example, the degree of freedom set at the present time may be displayed on the display as a character message, or the degree of freedom set at the present time may be output from the speaker as a voice message.

A controller 210 is configured of a processor such as a central processing unit (CPU), and a primary storage including a read only memory (ROM), and a random access memory (RAM) to centrically control the parent vehicle Vp. The controller 210 includes a drive control unit 211, a degree of freedom setting unit 212, and a forcing command generation unit 213. The controller 210 may have the configuration of an auxiliary storage, such as a hard disk drive and a removable media. The auxiliary storage may store an operating system (OS), various programs, and various tables. The programs stored in the auxiliary storage may be loaded to a work area of the primary storage and be executed there. Through execution of the programs, each component unit of the controller 210 may be controlled such that a function matched with a prescribed target may be implemented.

The drive control unit 211 generates and outputs a control signal for controlling the driving unit 150, based on detection values output from various sensors mounted on the vehicle V. In one example, the drive control unit 211 executes a prescribed arithmetic process, based on the attitude information output from the attitude sensor 191, the rotation information regarding the wheels 140 output from the rotation sensors 192, or the like. As a result, the drive control unit 211 generates a control signal necessary for the vehicle to move at a prescribed speed while maintaining an inverted state. The drive control unit 211 then outputs the generated control signal to the driving unit 150.

Based on the instruction for setting the degree of freedom input from the input unit 180, the degree of freedom setting unit 212 sets the degree of freedom relevant to movement of the worker vehicle Vw, and registers the set degree of freedom in the group management database DB1. The degree of freedom setting unit 212 transmits the set degree of freedom to the worker vehicle Vw. Once the degree of freedom of the worker vehicle Vw is set, the degree of freedom setting unit 212 monitors whether the worker vehicle Vw follows the set degree of freedom (that is, whether the worker vehicle Vw moves in the range of the degree of freedom).

Figure 5:
FIG. 5 illustrates a registration content of a degree of freedom management table.

FIG. 5 illustrates the registration content of a degree of freedom management table TA2 held by the degree of freedom setting unit 212. Registered in the degree of freedom management table TA2 are allowable values of parameters relevant to movement for each degree of freedom that can be set. The degree of freedom can be set as numerical values in the range of, for example, "0" to "100." A degree of freedom "0" represents a severest restriction, where the free movement of the worker vehicle Vw is not permitted in principle (what is called a complete follower). A degree of freedom "100" represents no restriction, where the worker vehicle Vw can freely move in principle. In FIG. 5, the parameters relevant to restricted movement include a movement distance, a movement speed, a movement acceleration, and a movement range. However, the parameters to be used and allowable values to be set for the parameters may optionally be set and changed depending on system design or the like. For example, as for the movement range, a movement range Am may be set in a substantially circular shape as shown by A of FIG. 6. In addition, as shown by B of FIG. 6, the movement range Am may be set in a substantially fan shape, or the movement range Am may be set in a substantially windmill shape as shown by C of FIG. 6.

The forcing command generation unit 213 generates a forcing command for forcibly controlling the movement of the worker vehicle Vw, irrespective of the degree of freedom ("0" to "100") set for the worker vehicle Vw. Examples of the forcing command may include an emergency shutdown command that is generated in order to prevent a collision with other vehicles. However, it is not intended to limit the forcing command to the emergency shutdown command. When the parent user inputs an instruction for emergency shutdown (for example, a voice input of "simultaneous stop" or the like), the forcing command generation unit 213 generates a forcing command in accordance with the input instruction, and transmits the forcing command to the worker vehicle Vw that is in a leader-follower relationship. The forcing command may be transmitted to all the worker vehicles Vw in the leader-follower relationship in principle. It is also possible to transmit the forcing command only to a specific worker vehicle Vw in the leader-follower relationship.

A-4. System Configuration of Worker Vehicle

Figure 7:
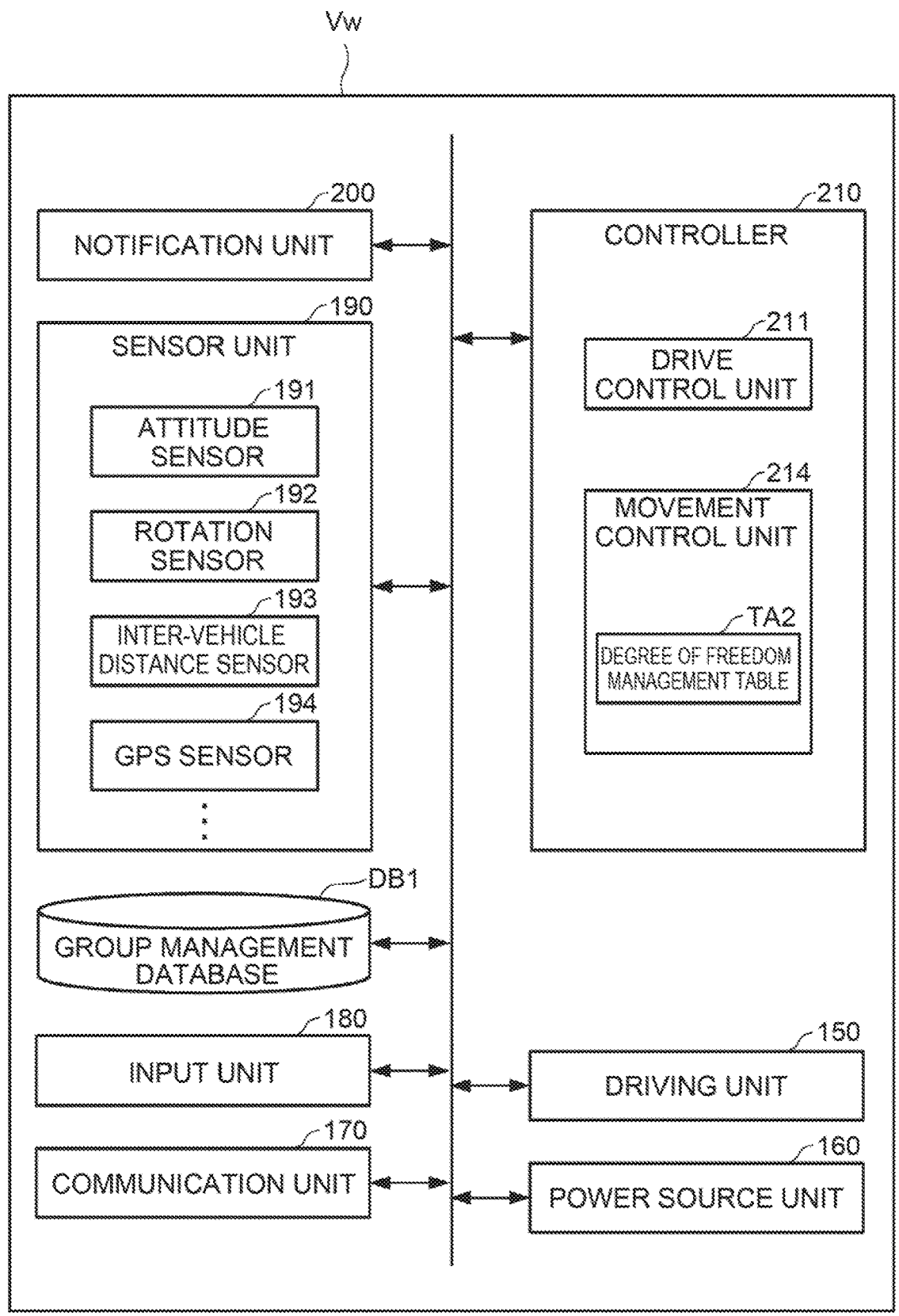
FIG. 7 is a block diagram showing the system configuration of the worker vehicle.

FIG. 7 is a block diagram showing the system configuration of the worker vehicle (follower movable body) Vw. As is clear from comparison with the parent vehicle Vp shown in FIG. 3, the configurational aspects of the worker vehicle Vw are mostly in common with those of the parent vehicle Vp. Accordingly, corresponding component members are designated by corresponding reference numerals to omit detailed description.

The controller 210 of the worker vehicle Vw includes a movement control unit 214 instead of the degree of freedom setting unit 212 and the forcing command generation unit 213 shown in FIG. 3. The movement control unit 214 controls the movement of the worker vehicle Vw in accordance with the degree of freedom received from the parent vehicle Vp. The degree of freedom management table TA2 shown in previously shown FIG. 5 is registered in the movement control unit 214. In the case where, for example, the degree of freedom is set to "60", the movement control unit 214 controls the movement of the worker vehicle Vw such that the parameters such as the movement distance, the movement speed, the movement acceleration, and the movement range become less than the allowable values set for the degree of freedom "100." Upon reception of a forcing command from the parent vehicle Vp, the movement control unit 214 executes the received forcing command at top priority, irrespective of the degree of freedom set for the vehicle Vw. For example, when receiving the forcing command for emergency shutdown, the movement control unit 214 performs emergency shutdown of the worker vehicle Vw by operating a brake mechanism (illustration omitted) or the like.

The degree of freedom received from the parent vehicle Vp may be notified by using the notification unit 200 such that the degree of freedom set for the worker vehicle Vw can be confirmed. For example, the degree of freedom set at the present time may be displayed on the display as a character message, or the degree of freedom set at the present time may be output from the speaker as a voice message.

Hereinafter, description is given of the operation relevant to group travel of the parent vehicle Vp and the worker vehicle Vw. As a prerequisite, a leader-follower relationship is set between the parent vehicle Vp and the worker vehicle Vw.

A-5. Operation of Parent Vehicle

Figure 8:
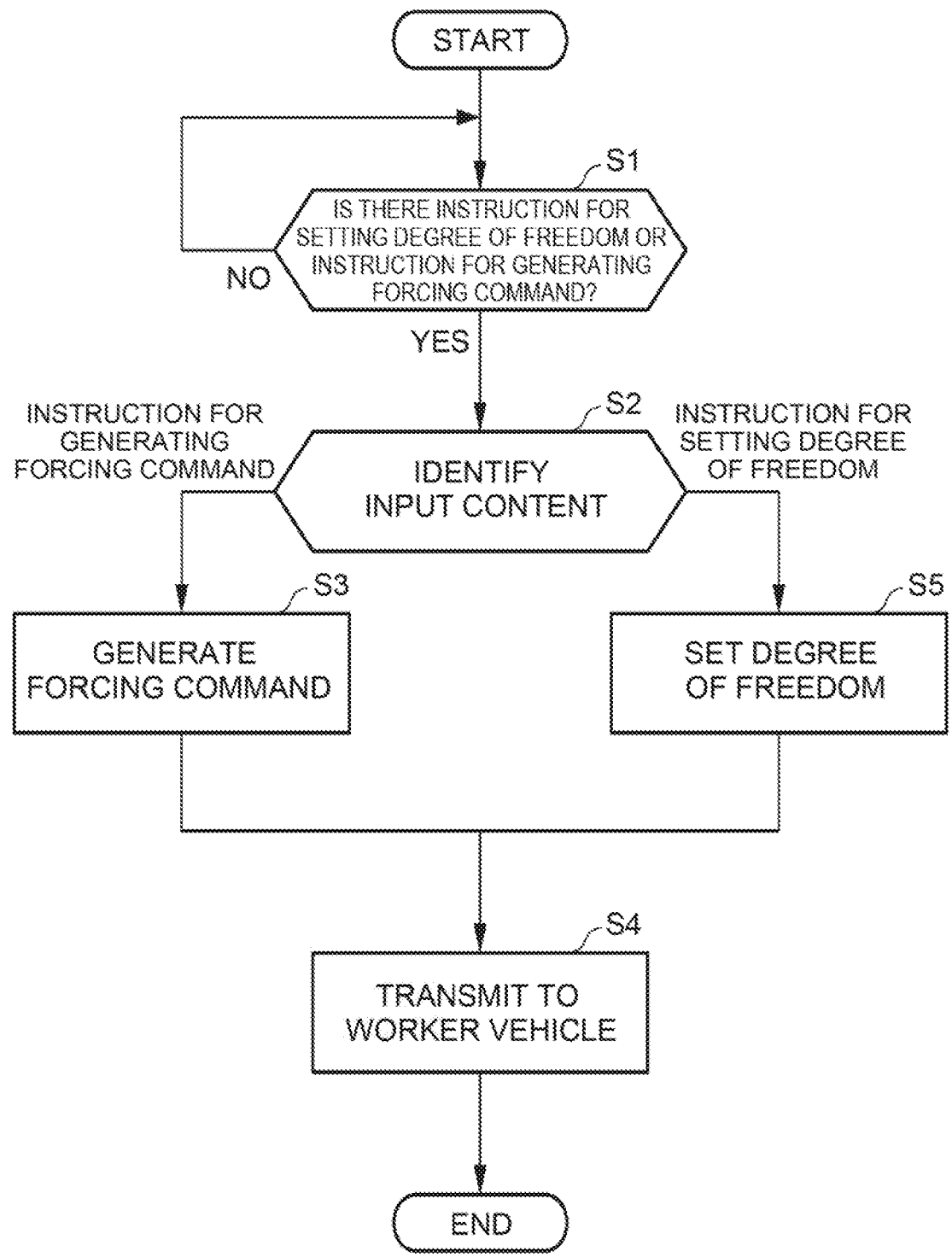
FIG. 8 is a flowchart showing an operation process of the parent vehicle.

FIG. 8 is a flowchart showing an operation process of the parent vehicle Vp. The controller 210 of the parent vehicle Vp determines whether or not an instruction for setting the degree of freedom or an instruction for generating a forcing command is input through the input unit 180 (step S1). When determining that neither of the instructions is input (step S1; NO), the controller 210 repeatedly executes the process of step S1. When detecting that the instruction for setting the degree of freedom or the instruction for generating a forcing command is input while repeatedly executing the process of step S1 (step S1; YES), the controller 210 identifies an input content as one of the instruction for setting the degree of freedom and the instruction for generating a forcing command (step S2).

When determining that the input content is the instruction for generating a forcing command, the controller 210 shifts to step S3. In step S3, the controller 210 generates a forcing command for forcibly controlling the movement of the worker vehicle Vw (for example, a forcing command for emergency shutdown), and transmits the generated command to the worker vehicle Vw (step S4). Then, the controller 210 ends the process.

When determining that the input content is the instruction for setting the degree of freedom, the controller 210 shifts to step S5. In step S5, the controller 210 sets the degree of freedom (for example, degree of freedom "60") relevant to the movement of the worker vehicle Vw, and registers the set degree of freedom in the group management database DB1. The controller 210 then transmits the set degree of freedom to the worker vehicle Vw (step S4), and ends the process.

A-6. Operation of Worker Vehicle

Figure 9:
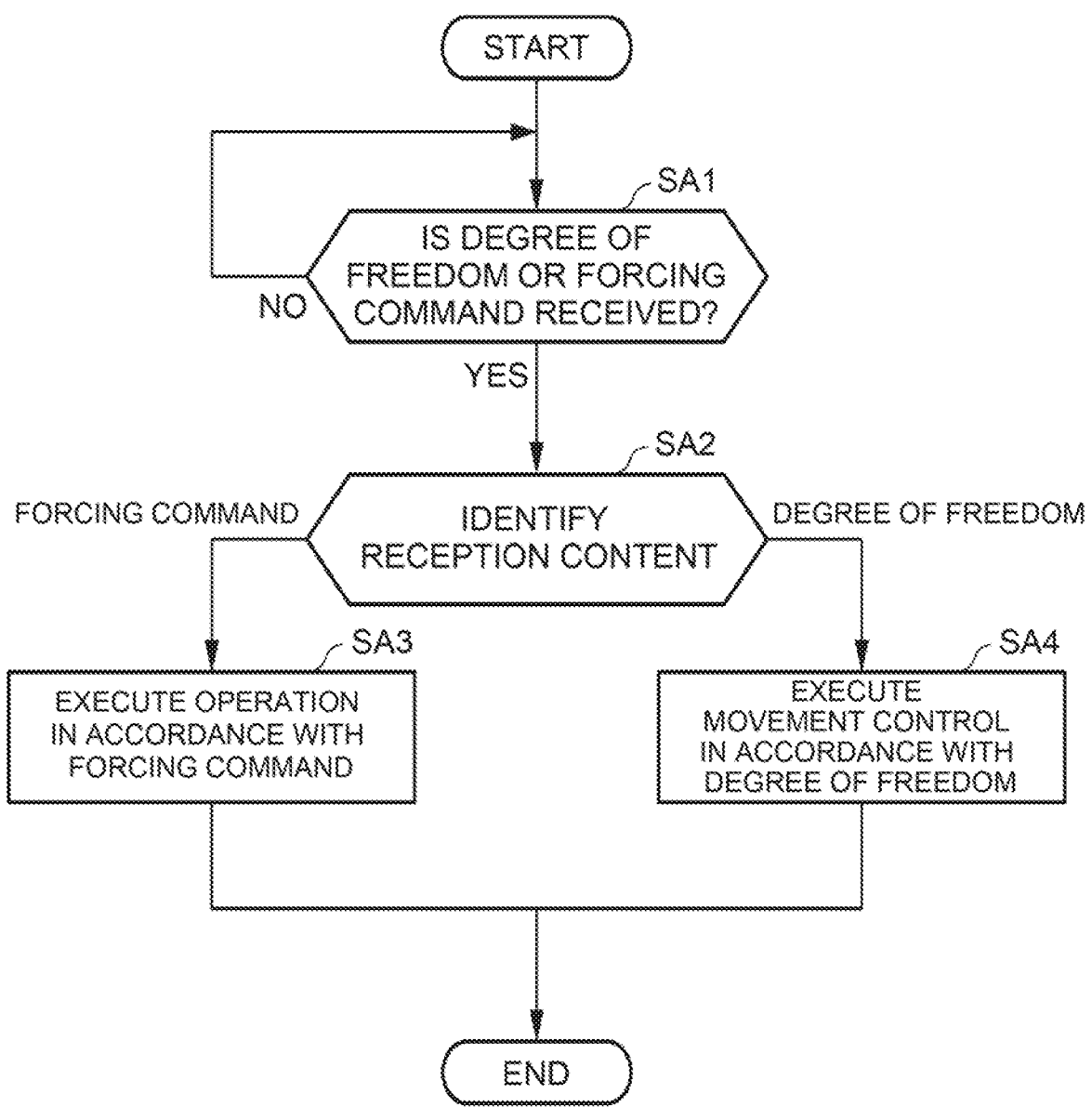
FIG. 9 is a flowchart illustrating an operation process of the worker vehicle.

FIG. 9 is a flowchart illustrating an operation process of the worker vehicle Vw. The controller 210 of the worker vehicle Vw determines whether or not the degree of freedom or the forcing command is received from the parent vehicle Vp through the communication unit 170 (step SA1). When determining that neither of the instructions is received (step SA1; NO), the controller 210 repeatedly executes the process of step SA1. When receiving the degree of freedom or a forcing command while repeatedly executing the process of step SA1 (step SA1; YES), the controller 210 identifies a reception content as one of the degree of freedom and a forcing command (step SA2).

When determining that the reception content is the forcing command, the controller 210 shifts to step SA3. In step SA3, the controller 210 performs operation in accordance with the forcing command (for example, emergency shutdown of the worker vehicle Vw), and ends the process.

Meanwhile, when determining that the reception content is the degree of freedom, the controller 210 shifts to step SA4, where the movement of the worker vehicle Vw is restricted. For example, when the reception content is an instruction to change the degree of freedom from "60" to "30", the controller 210 controls the movement of the worker vehicle Vw such that the parameters become less than the allowable values set for the previous degree of freedom "60." Then, the controller 210 ends the process.

As described in the foregoing, the present embodiment enables the parent vehicle Vp that sets the leader-follower relationship with the worker vehicles Vw to set the degree of freedom relevant to the movement of the worker vehicle Vw. Meanwhile, the worker vehicle Vw with a set degree of freedom can freely move in the range of the set degree of freedom, while following the parent vehicle Vp, instead of being forced to completely follow the parent vehicle Vp. Accordingly, the user who controls the worker vehicle Vw can actively determine a moving route in the range of the degree of freedom, and therefore the user can enjoy the pleasure of moving with the worker vehicle Vw.

B. Modification

According to the embodiment disclosed, the degree of freedom of the worker vehicle Vw is manually set and changed in accordance with an input operation by the parent user. Instead of (or in addition to) the above configuration, the degree of freedom of the worker vehicle Vw may automatically be set and changed in accordance with the detection result of the sensor unit 190.

For example, when it is determined based on the location information detected by the GPS sensor 194 in the sensor unit 190 that a flat landscape is changed to a landscape with uphills and downhills, the degree of freedom setting unit 212 of the parent vehicle Vp changes the set degree of freedom from a high value to a low value (for example, "50" to "25") to impose a more strict movement restriction on the worker vehicle Vw. Such configuration makes it possible to achieve a safer group travel.

Figure 10:
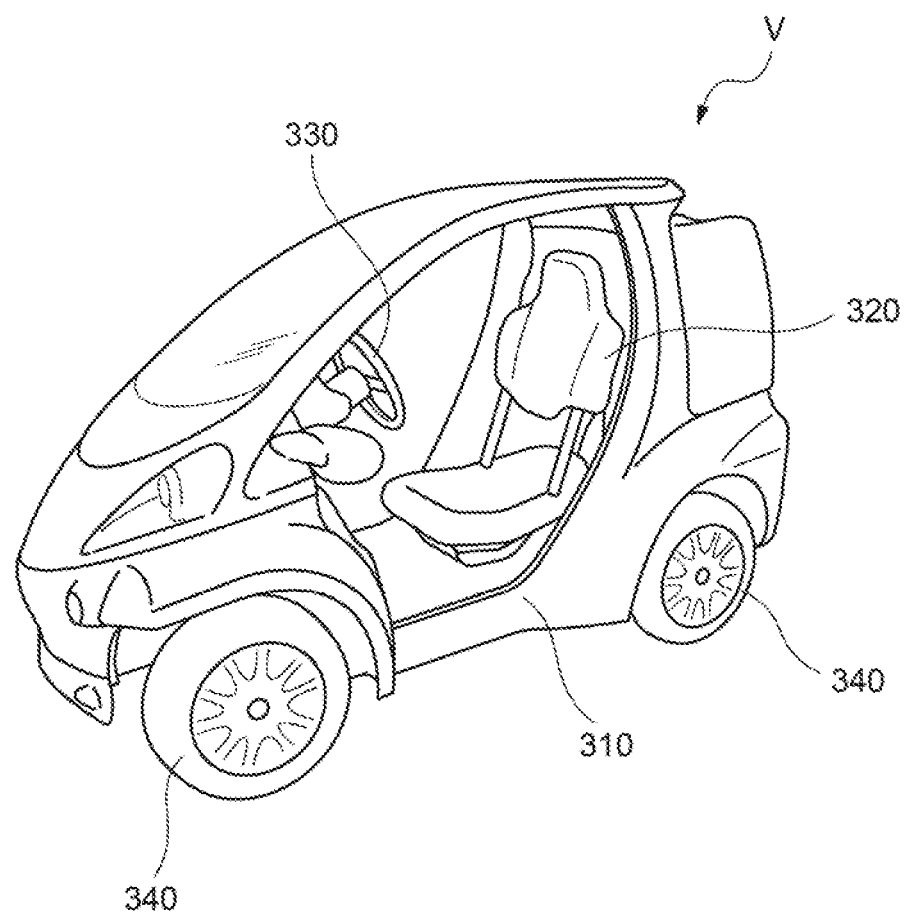
FIG. 10 is an appearance view of a vehicle according to a modification.

In the embodiment disclosed, an inverted mobile object that is operated by a user who rides in a standing state is illustrated as an example of the vehicle V. However, it is not intended to limit the present disclosure to the above configuration. FIG. 10 is an appearance view of a vehicle V according to a modification. The vehicle V includes a vehicle body 310, and a seat unit 320 where a user can seat, the seat unit 320 being attached to the vehicle body 310. The vehicle V also includes an operating unit 330 that enables the user to grip and drive the vehicle, and four driving wheels 340 rotatably attached to the vehicle body 310.

For example, the vehicle V according to the modification is a compact vehicle for up to two people, the vehicle V allowing a user himself or herself to operate. The vehicle V applied to the present modification is not limited to the ultra-compact movable body. Rather, the vehicle V may include vehicles other than the ultra-compact movable body, such as an ordinary motor vehicle. The vehicle V may have any number of wheels. Furthermore, application targets of the present disclosure are not intended to be limited to vehicles such as motorcycles and automobiles. The present disclosure may also be applicable to various types of movable bodies (such as boats and flying bodies) without wheels.

C. Others

The present disclosure is not limited to the embodiment disclosed, but may be performed in other various forms without departing from the scope of the present disclosure. Therefore, the embodiment disclosed is in all respects illustrative and is not considered as the basis for restrictive interpretation. For example, the order of the process steps described above may optionally be changed or executed in parallel, without producing inconsistency in the contents of the process.

In the present specification, "units" do not simply refer to physical component members. Rather, they also refer to the cases where the processes executed by "units" are implemented by software. Moreover, the process to be executed by one "unit" may be implemented by two or more physical component members or devices, and the process to be executed by two or more "units" may be implemented by one physical means or device.

What is claimed is:

1. A leader movable body comprising:
a degree of freedom setting unit configured to set a degree of freedom relating to movement of a follower movable body; and
a transmitter configured to transmit the degree of freedom to the follower movable body, wherein
the follower movable body is configured to perform group travel with respect to the leader movable body, and
the degree of freedom includes an allowable value of a movement area that the follower movable body is permitted to occupy relative to a position of the leader movable body.

2. The leader movable body according to claim 1, wherein the degree of freedom also includes an allowable value of at least one parameter out of a movement distance, a movement speed, and a movement acceleration of the follower movable body.

3. The leader movable body according to claim 1, further comprising an input unit configured to allow a user to input an instruction for setting the degree of freedom relating to movement of the follower movable body, wherein
the degree of freedom setting unit is configured to set the degree of freedom in accordance with the instruction for setting the degree of freedom input to the input unit.

4. The leader movable body according to claim 1, further comprising a sensor unit configured to detect a surrounding environment of the leader movable body, wherein
the degree of freedom setting unit is configured to set the degree of freedom based on a detection result of the sensor unit.

5. The leader movable body according to claim 1, further comprising a generation unit configured to generate a forcing command for forcibly controlling movement of the follower movable body, irrespective of the degree of freedom set for the follower movable body.

6. The leader movable body according to claim 1, wherein changing the allowable value of the movement area changes a shape of the movement area that the follower movable body is permitted to occupy.

7. The leader movable body according to claim 1, wherein the movement area is set to one of a substantially circular shape, a substantially fan shape and a substantially windmill shape.

8. A follower movable body comprising:
a receiver configured to receive, from a leader movable body, a degree of freedom relating to movement of the follower movable body; and
a movement control unit configured to control movement of the follower movable body in accordance with the degree of freedom, wherein
the follower movable body is configured to perform group travel with respect to the leader movable body, and
the degree of freedom includes an allowable value of a movement area that the follower movable body is permitted to occupy relative to a position of the leader movable body.

9. The follower movable body according to claim 8, further comprising a notification unit configured to notify the degree of freedom to a user of the follower movable body.

10. The follower movable body according to claim 8, wherein changing the allowable value of the movement area changes a shape of the movement area that the follower movable body is permitted to occupy.

11. The follower movable body according to claim 8, wherein the movement area is set to one of a substantially circular shape, a substantially fan shape and a substantially windmill shape.

12. A group travel control system comprising:
a leader movable body; and
a follower movable body configured to perform group travel with respect to the leader movable body, wherein:
the leader movable body includes
    a degree of freedom setting unit configured to set a degree of freedom relating to movement of the follower movable body, and
    a transmitter configured to transmit the degree of freedom to the follower movable body;
the follower movable body includes
    a receiver configured to receive the degree of freedom from the leader movable body; and
    a movement control unit configured to control movement of the follower movable body in accordance with the degree of freedom; and
    the degree of freedom includes an allowable value of a movement area that the follower movable body is permitted to occupy relative to a position of the leader movable body.

13. The group travel control system according to claim 12, wherein the group travel control system is configured such that a leader-follower relationship is set between the leader movable body and the follower movable body.

14. The group travel control system according to claim 12, wherein changing the allowable value of the movement area changes a shape of the movement area that the follower movable body is permitted to occupy.

15. The group travel control system according to claim 12, wherein the movement area is set to one of a substantially circular shape, a substantially fan shape and a substantially windmill shape.

* * * * *